US012080463B2

(12) United States Patent
Yoshikawa

(10) Patent No.: US 12,080,463 B2
(45) Date of Patent: Sep. 3, 2024

(54) REACTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Kohei Yoshikawa, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 610 days.

(21) Appl. No.: 17/296,366

(22) PCT Filed: Nov. 27, 2019

(86) PCT No.: PCT/JP2019/046467

§ 371 (c)(1),
(2) Date: May 24, 2021

(87) PCT Pub. No.: WO2020/116293

PCT Pub. Date: Jun. 11, 2020

(65) Prior Publication Data

US 2021/0398735 A1 Dec. 23, 2021

(30) Foreign Application Priority Data

Dec. 3, 2018 (JP) ................................ 2018-226542

(51) Int. Cl.
*H01F 17/04* (2006.01)
*H01F 1/20* (2006.01)
(Continued)

(52) U.S. Cl.
CPC ............ *H01F 27/255* (2013.01); *H01F 1/20* (2013.01); *H01F 3/08* (2013.01); *H01F 3/14* (2013.01);
(Continued)

(58) Field of Classification Search
CPC .................................................... H01F 27/255
See application file for complete search history.

(56) References Cited

U.S. PATENT DOCUMENTS 3,636,345 A * 1/1972 Hirschel .............. H01J 49/322
250/296
2015/0035639 A1 2/2015 Nakamura et al.
(Continued)

FOREIGN PATENT DOCUMENTS

JP 2013-026492 A 2/2013
JP 3195212 U 1/2015
JP 2018-107341 A 7/2018

OTHER PUBLICATIONS

English translation of JP3195212 (Year: 2015).*
(Continued)

*Primary Examiner* — Ronald Hinson
(74) *Attorney, Agent, or Firm* — Venjuris, P.C.

(57) ABSTRACT

A reactor is provided with a coil including a winding portion, and a magnetic core including an inner core portion to be arranged inside the winding portion and an outer core portion to be arranged outside the winding portion. The magnetic core includes a communication hole penetrating through the outer core portion and leading to the inner core portion, and a coupling shaft made of a composite material filled into the communication hole and coupling the inner core portion and the outer core portion. The composite material is obtained by dispersing a soft magnetic powder in a resin.

8 Claims, 5 Drawing Sheets

(51) Int. Cl.

| | |
|---|---|
| ***H01F 3/08*** | (2006.01) |
| ***H01F 3/14*** | (2006.01) |
| ***H01F 27/255*** | (2006.01) |
| ***H01F 27/28*** | (2006.01) |
| ***H01F 37/00*** | (2006.01) |
| ***H01F 41/02*** | (2006.01) |

(52) U.S. Cl.
CPC ......... *H01F 27/2823* (2013.01); *H01F 37/00* (2013.01); *H01F 41/0246* (2013.01)

(56) References Cited

U.S. PATENT DOCUMENTS

| | | | |
|---|---|---|---|
| 2015/0357109 | A1 | 12/2015 | Nobusaka et al. |
| 2017/0263356 | A1 | 9/2017 | Kusawake et al. |
| 2019/0189339 | A1 | 6/2019 | Yamamoto et al. |

OTHER PUBLICATIONS

English translation of JP02021608 (Year: 1990).*
International Search Report issued on Feb. 4, 2020 for WO 2020/116293 A1 (6 pages).

* cited by examiner

REACTOR

CROSS REFERENCE TO RELATED APPLICATIONS

This application is a national phase of PCT application No. PCT/JP2019/046467, filed on 27 Nov. 2019, which claims priority from Japanese patent application No. 2018-226542, filed on 3 Dec. 2018, all of which are incorporated herein by reference.

TECHNICAL FIELD

The present disclosure relates to a reactor.

BACKGROUND

For example, a reactor including a coil having a winding portion formed by winding a winding wire and a magnetic core for forming a closed magnetic path is disclosed in Patent Document 1. The magnetic core of this reactor can be divided into an inner core portion to be arranged inside the winding portion and an outer core portion to be arranged outside the winding portion. In Patent Document 1, the magnetic core is formed by coupling the inner core portion formed by assembling a plurality of core pieces independent of each other and gap members and core pieces forming the outer core portion by bolt members.

PRIOR ART DOCUMENT

Patent Document

Patent Document 1: JP 3195212 U

SUMMARY OF THE INVENTION

Problems to be Solved

The present disclosure is directed to a reactor with a coil including a winding portion, and a magnetic core including an inner core portion to be arranged inside the winding portion and an outer core portion to be arranged outside the winding portion, wherein the magnetic core includes a communication hole penetrating through the outer core portion and leading to the inner core portion, and a coupling shaft made of a composite material filled into the communication hole, the coupling shaft coupling the inner core portion and the outer core portion, and the composite material is obtained by dispersing a soft magnetic powder in a resin.

DETAILED DESCRIPTION TO EXECUTE THE INVENTION

Technical Problem

Figure 1:
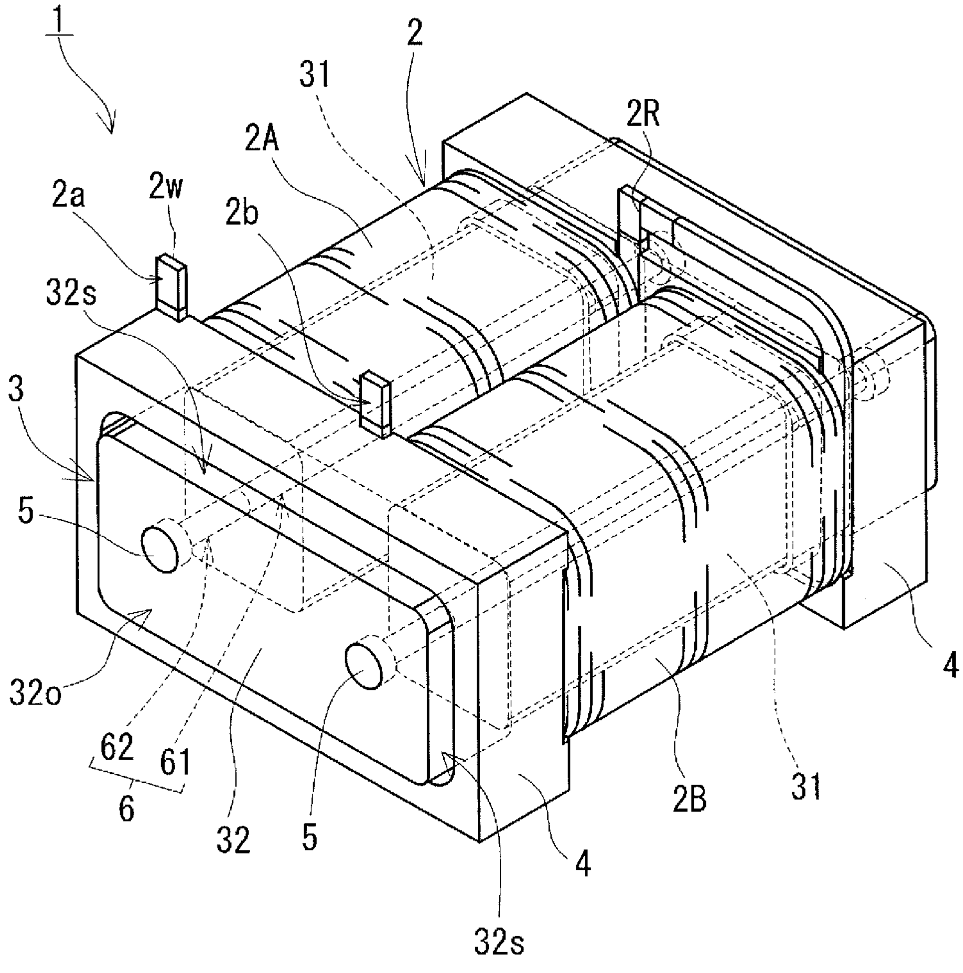
FIG. 1 is a perspective view of a reactor of a first embodiment.

According to the configuration of Patent Document 1, the plurality of core pieces can be accurately coupled. Further, since the bolt members for coupling the core pieces are arranged to penetrate through all the core pieces and not arranged outside the coil, the enlargement of the reactor due to the bolt members can be suppressed. However, in the configuration of Patent Document 1, there is room for improvement in productivity and magnetic properties may be reduced.

Firstly, since the inner core portion is composed of the plurality of core pieces and the gap members, through holes have to be provided in each core piece and each gap member. Further, an operation of aligning the core pieces and the gap members and an operation of aligning the bolt members with the through holes of the respective members and passing the bolt members through the members are cumbersome.

Secondly, in the configuration of Patent Document 1, the bolt members are arranged in parts serving as the magnetic path and magnetic properties of the reactor are not good. This is because the material of the bolt members of Patent Document 1 is thought to be selected in consideration of tightening strength by the bolt members, but not in consideration of the magnetic properties of the reactor.

Accordingly, one object of the present disclosure is to provide a reactor which is excellent in magnetic properties and can be manufactured with good productivity in a simple procedure.

Effect of Present Disclosure

The reactor of the present disclosure is excellent in magnetic properties and can be manufactured with good productivity in a simple procedure.

Description of Embodiments of Present Disclosure

First, embodiments of the present disclosure are listed and described.

<1> A reactor according to an embodiment is provided with a coil including a winding portion, and a magnetic core including an inner core portion to be arranged inside the winding portion and an outer core portion to be arranged outside the winding portion, wherein the magnetic core includes a communication hole penetrating through the outer core portion and leading to the inner core portion, and a coupling shaft made of a composite material filled into the communication hole, the coupling shaft coupling the inner core portion and the outer core portion, and the composite material is obtained by dispersing a soft magnetic powder in a resin.

In the case of manufacturing the reactor having the above configuration, the inner core portion and the outer core portion are aligned and the composite material is filled into the communication hole penetrating through the outer core portion and leading to the inner core portion. As a result, the softened resin of the composite material adheres to the communication hole, the communication hole and the coupling shaft made of the composite material are fused over entire lengths while hardly forming any clearance therebetween, and the outer core portion and the inner core portion are coupled by the coupling shaft. As just described, according to the configuration of the above reactor, the reactor is completed only by filling the composite material into the communication hole, wherefore the productivity of the reactor is improved.

In the reactor having the above configuration, magnetic properties required for the reactor are hardly reduced. This is because a reduction in the magnetic properties required for the magnetic core of the reactor is suppressed since the coupling shaft for coupling the inner core portion and the outer core portion is made of the composite material.

<2> As one mode of the reactor according to the embodiment, each of the inner core portion and the outer core portion may be an integrated body having an undivided structure.

Each of the inner core portion and the outer core portion may be an assembly of divided pieces. However, if each of the inner core portion and the outer core portion is an integrated body having an undivided structure, the inner core portion and the outer core portion are easily aligned when the reactor is manufactured. As a result, the productivity of the reactor is improved.

<3> As one mode of the reactor according to the embodiment, the coupling shaft may include a retaining portion to be hooked to an inner peripheral surface of the communication hole in an axial direction thereof.

By forming the retaining portion on the coupling shaft, the coupling shaft is less likely to be mechanically detached from the magnetic core. As a result, the inner core portion and the outer core portion can be more firmly coupled by the coupling shaft. The configuration of the retaining portion is not particularly limited. For example, the retaining portion may be formed by thread-like irregularities formed on the outer peripheral surface of the coupling shaft.

<4> As one mode of the reactor of <3> above, the coupling shaft may include a protruding portion protruding in a direction intersecting the axial direction, and the retaining portion may be formed by the protruding portion.

If the retaining portion is formed by the protruding portion protruding in the direction intersecting the axial direction of the coupling shaft, the detachment of the coupling shaft from the magnetic core can be reliably prevented. The protruding portion may be, for example, a thick shaft portion making a transverse cross-sectional area of the coupling shaft locally large. Further, the protruding portion may be, for example, a crossing shaft intersecting the axial direction of the coupling shaft.

<5> As one mode of the reactor of <3> or <4> above, the retaining portion may be formed inside the outer core portion.

By forming the retaining portion of the coupling shaft inside the outer core portion, the detachment of the outer core portion from the inner core portion can be effectively suppressed.

<6> As one mode of the reactor of <5> above, the retaining portion may also be formed inside the inner core portion.

By also forming the retaining portion of the coupling shaft inside the inner core portion, the inner core portion and the outer core portion can be more firmly coupled.

<7> As one mode of the reactor of <4> above, the protruding portion may be formed over the outer core portion and the inner core portion.

By forming the protruding portion over the outer core portion and the inner core portion, an increase in the loss of the reactor can be suppressed. In the reactor of this example in which the outer core portion and the inner core portion are coupled by the coupling shaft, a clearance (air gap) may be formed in a boundary of the both core portions. If the air gap is formed in the boundary, magnetic fluxes leak from that air gap and the loss of the reactor increases. In contrast, if the protruding portion is formed over the both core portions, a facing area of the both core portions is reduced by the protruding portion. As a result, the air gap is less likely to be formed in the boundary of the both core portions, wherefore an increase in the loss of the reactor can be suppressed.

<8> As one mode of the reactor according to the embodiment, the inner core portion may be made of a composite material obtained by dispersing a soft magnetic powder in a resin.

Since containing the resin, the composite material is better in machinability than a powder compact formed by pressure-molding a soft magnetic powder. Since particularly the inner core portion may be formed with a communication hole having a complicated shape as shown in embodiments to be described later, it is preferred to form the inner core portion of the composite material excellent in machinability.

By constituting the inner core portion by the composite material, the magnetic properties of the entire reactor are easily adjusted. This is because the magnetic properties of the composite material are easily adjusted by adjusting the content of the soft magnetic powder of the composite material. Particularly, if each of the inner core portion and the outer core portion is an independent molded body, a room for interposing a gap member is only present between the inner core portion and the outer core portion and it is difficult to adjust the magnetic properties of the entire reactor. In contrast to this configuration, it is effective to constitute the inner core portion by the composite material.

<9> As one mode of the reactor according to the embodiment, the outer core portion may be constituted by a powder compact made of a soft magnetic powder.

The content of the soft magnetic powder of the powder compact is easily increased, and the saturation magnetic flux density and relative magnetic permeability of the powder compact are easily enhanced by increasing this content. Particularly, if the inner core portion is a composite material and the outer core portion is a powder compact, it is possible to obtain a reactor having highly excellent magnetic properties.

DETAILS OF EMBODIMENTS OF PRESENT DISCLOSURE

Hereinafter, embodiments of a reactor of the present disclosure are described in detail with reference to the drawings. The same components are denoted by the same reference signs in the drawings. Note that the present invention is not limited to configurations shown in the embodiments and is intended to be represented by claims and include all changes in the scope of claims and in the meaning and scope of equivalents.

First Embodiment

Figure 2:
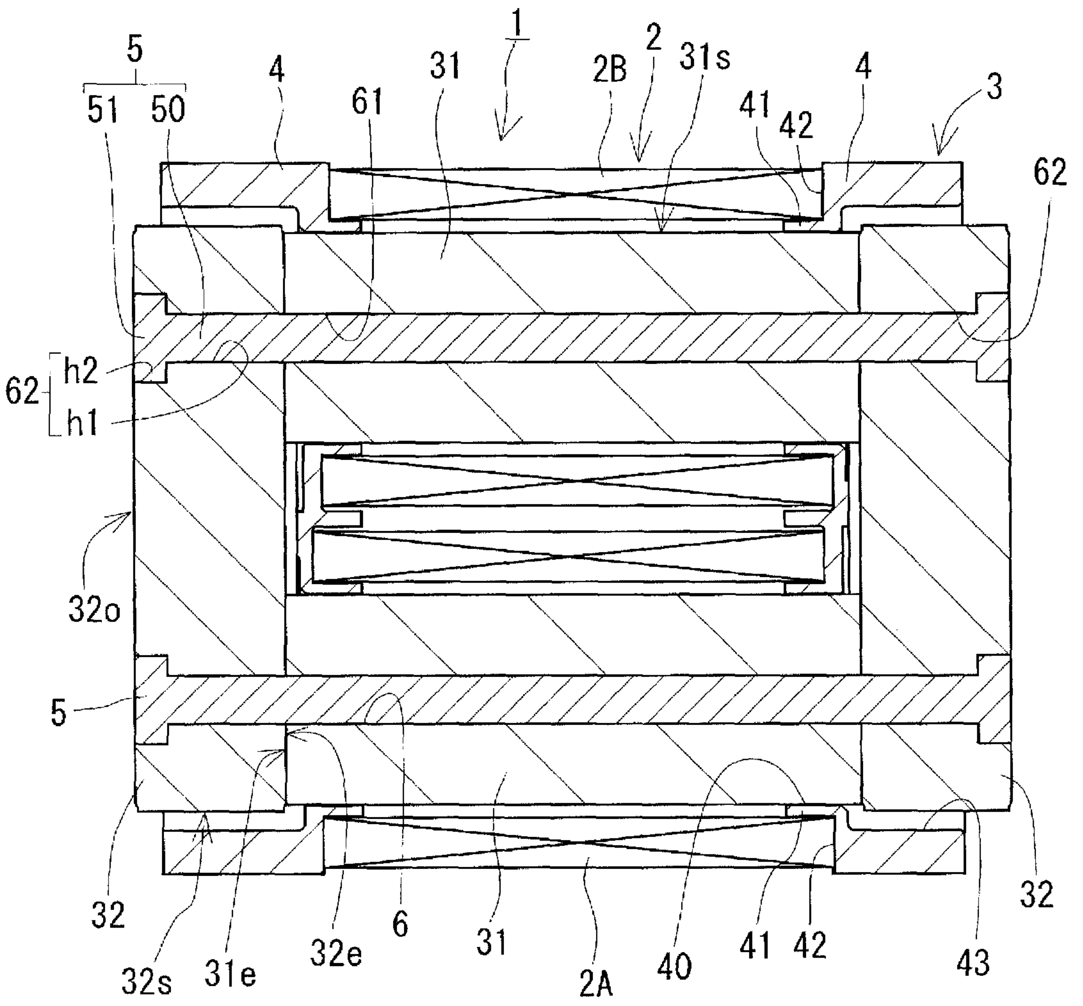
FIG. 2 is a horizontal section of the reactor of FIG. 1.

The configuration of a reactor 1 is described on the basis of FIGS. 1 and 2 in a first embodiment. The reactor 1 shown in FIG. 1 is configured by assembling a coil 2, a magnetic core 3 and holding members 4. The magnetic core 3 includes inner core portions 31 and outer core portions 32. One of features of this reactor 1 is that each of the inner and outer core portions 31, 32 is an integrated body having an undivided structure and the inner and outer core portions 31, 32 are coupled by coupling shafts 5 made of a composite material. Each component provided in the reactor 1 is described in detail below.

<<Coil>>

The coil 2 of this embodiment includes a pair of winding portions 2A, 2B and a coupling portion 2R coupling the both winding portions 2A, 2B as shown in FIG. 1. The respective winding portions 2A, 2B are formed into a hollow tubular shape having the same number of turns and the same winding direction, and arranged in parallel so that axial directions thereof are parallel. Although the coil 2 is manufactured by coupling the winding portions 2A, 2B made of separate winding wires 2*w* in this example, the coil 2 can also be manufactured by one winding wire 2*w*.

Each winding portion 2A, 2B of this embodiment is formed into a rectangular tube shape. The winding portion 2A, 2B in the form of a rectangular tube is a winding portion with end surfaces having a rectangular shape (including a square shape) with rounded corners. Of course, the winding portions 2A, 2B may be formed into a hollow cylindrical shape. The hollow cylindrical winding portion is a winding portion with end surfaces having a closed curved surface shape (elliptical shape, true circular shape, race track shape, etc.).

The coil 2 including the winding portions 2A, 2B can be made of coated wires each including a conductor such as a flat rectangular wire or round wire made of a conductive material such as copper, aluminum, magnesium or an alloy of one of these and an insulation coating made of an insulating material and provided on the outer periphery of the conductor. In this embodiment, each winding portion 2A, 2B is formed by winding a coated flat rectangular wire including a conductor in the form of a flat rectangular wire (winding wire 2*w*) made of copper and an insulation coating made of enamel (typically, polyamide-imide) in an edgewise manner.

Both end parts 2*a*, 2*b* of the coil 2 are pulled out from the winding portions 2A, 2B and connected to unillustrated terminal members. The insulation coating such as enamel is striped in the both end parts 2*a*, 2*b*. An external device such as a power supply for supplying power to the coil 2 is connected via these terminal members.

<<Magnetic Core>>>

The magnetic core 3 includes the inner core portions 31, 31 to be respectively arranged inside the winding portions 2A, 2B and the outer core portions 32, 32 for forming a closed magnetic path together with the inner core portions 31, 31. The magnetic core 3 of this example has a gap-less structure in which no gap member is arranged between the inner core portions 31 and the outer core portions 32, but may be structured to include gap members.

[Inner Core Portions]

The inner core portions 31 are parts extending along axial directions of the winding portions 2A, 2B of the coil 2, out of the magnetic core 3. In this example, both end parts of the parts of the magnetic core 3 extending along the axial directions of the winding portions 2A, 2B project from end surfaces of the winding portions 2A, 2B (FIG. 2). Those projecting parts are also parts of the inner core portions 31. End parts of the inner core portions 31 projecting from the winding portions 2A, 2B are inserted into through holes 40 of the holding members 4 to be described later.

The shape of the inner core portion 31 is not particularly limited as long as conforming to the inner shape of the winding portion 2A (2B). The inner core portion 31 of this example is substantially in the form of a rectangular parallelepiped. This inner core portion 31 is an integrated body having an undivided structure, which is one of factors facilitating the assembling of the reactor 1. Unlike this example, the inner core portion 31 can also be configured by assembling a plurality of divided cores. Further, the inner core portion 31 can be configured by interposing gap plates between the divided cores.

An end surface 31*e* in the axial direction of the inner core portion 31 is in contact with an inner surface 32*e* of the outer core portion 32 to be described later (FIG. 2). An adhesive may be present between the end surface 31*e* and the inner surface 32*e* or may not be present. This is because the inner core portion 31 and the outer core portion 32 are coupled by the coupling shaft 5 as described later. On the other hand, a peripheral surface 31*s* except the end surface 31*e*, out of the outer peripheral surface of the inner core portion 31, is facing the inner peripheral surface of the winding portion 2A, 2B, but held at a position separated from the inner peripheral surface without contacting the inner peripheral surface. This is because the inner core portion 31 and the winding portion 2A, 2B are both mechanically engaged with the holding members 4 to be described later and relative positions of the inner core portion 31 and the winding portion 2A, 2B are determined.

The inner core portion 31 of this example further includes an inner core hole 61. The inner core hole 61 of this example is a through hole penetrating through the inner core portion 31 in the axial direction. The inner core hole 61 has an inner peripheral surface shape uniform in an axial direction thereof. This inner core hole 61 constitutes a part of a communication hole 6 to be described later. The coupling shaft 5 made of the composite material is arranged inside the inner core hole 61. The composite material can be a constituent material of the magnetic core 3 as described later. Thus, a part of the coupling shaft 5 arranged inside the inner core hole 61 may be considered as a part of the inner core portion 31.

The inner core hole 61 of this example has a circular transverse cross-sectional shape orthogonal to the axial direction thereof. The transverse cross-sectional shape of the inner core hole 61 is not particularly limited and may be, for example, a polygonal shape such as a rectangular shape or a pentagonal shape. Further, an axis of the inner core hole 61 of this example coincides with an axis of the inner core portion 31. Unlike this example, the inner core hole 61 may be inclined with respect to the axial direction of the inner core portion 31.

A transverse cross-sectional area of the inner core hole 61 is not particularly limited. For example, when a transverse cross-sectional area of the inner core portion 31 is 100%, the transverse cross-sectional area of the inner core hole 61 may be 5% or more and 30% or less. Further, the transverse cross-sectional area of the inner core hole 61 with respect to the inner core portion 31 is preferably 10% or more and 25% or less and more preferably 10% or more and 20% or less.

The inner core hole 61 can be formed by a mold when the inner core portion 31 is molded. The inner core hole 61 can also be formed by machining. In this case, the inner core hole 61 can be formed by boring the end surface 31*e* by a drill or the like after the inner core portion 31 is molded.

[Outer Core Portions]

The outer core portion 32 is a part of the magnetic core 3 to be arranged outside the winding portions 2A, 2B (FIG. 1). The shape of the outer core portion 32 is not particularly limited as long as linking the end parts of the pair of inner core portions 31, 31. The outer core portion 32 of this example is a rectangular parallelepiped block body, but may be substantially dome-shaped or U-shaped in a top view. This outer core portion 32 is an integrated body having an undivided structure, which is one of factors facilitating the assembling of the reactor 1. Unlike this example, the outer core portion 32 can also be configured by assembling a plurality of divided cores.

The outer core portion 32 has the inner surface 32*e* facing the end surfaces of the winding portions 2A, 2B of the coil 2, an outer surface 32*o* opposite to the inner surface 32*e* and a peripheral surface 32*s*. The inner and outer surfaces 32*e*, 32*o* are flat surfaces parallel to each other. Out of the peripheral surface 32*s*, upper and lower surfaces are flat surfaces parallel to each other and orthogonal to the inner and outer surfaces 32*e*, 32*o*. Further, out of the peripheral surface 32*s*, two side surfaces are also flat surfaces parallel to each other and orthogonal to the inner and outer surfaces 32*e*, 32*o*.

The outer core portion 32 of this example further includes outer core holes 62 extending coaxially with the inner core holes 61. The outer core hole 62 of this example is a through hole having one end side open in the outer surface 32*o* and the other end side open in the inner surface 32*e*. Two outer core holes 62 are provided in one outer core portion 32. That is, four outer core holes 62 are provided in the entire reactor 1.

The outer core hole 62 of this example is a substantially T-shaped hole composed of a first hole portion h1 on the side of the inner core portion 31 and a second hole portion h2 on the side of the outer surface 32*o*. The first hole portion h1 is a hole having the same inner peripheral surface shape and cross-sectional area as the inner core hole 61. On the other hand, the second hole portion h2 is a hole having a larger cross-sectional area than the first hole portion h1. The cross-sectional area mentioned here is an area of a transverse cross-section orthogonal to an axial direction of the outer core hole 62 (communication hole 6). Unlike this example, the cross-sectional area of the first hole portion h1 may be smaller or larger than that of the inner core hole 61.

The coupling shaft 5 made of the composite material is also arranged inside the outer core hole 62. Accordingly, a part of the coupling shaft 5 arranged inside the outer core hole 62 may be considered as a part of the outer core portion 32.

[Materials, Etc.]

The inner and outer core portions 31, 32 can be constituted by powder compacts formed by pressure-molding a raw material powder containing a soft magnetic powder or compacts made of a composite material obtained by dispersing a soft magnetic powder in a resin. Besides, the core portions 31, 32 can be hybrid cores formed by covering the outer peripheries of powder compacts with a composite material. Further, the core portions 31, 32 may be compacts made of a composite material in which gap plates of alumina or the like are embedded or may be mold cores formed by coupling core pieces and gap plates and covering the outer peripheries of the coupled assembly with a resin.

A powder compact can be manufactured by filling a raw material powder into a mold and pressurizing the filled raw material powder. Because of its manufacturing method, the content of a soft magnetic powder is easily increased in the powder compact. For example, the content of the soft magnetic powder in the powder compact can be more than 80% by volume and further equal to or more than 85% by volume. Thus, if powder compacts are used, the core portions 31, 32 having a high saturation magnetic flux density and a high relative magnetic permeability are easily obtained. For example, the relative magnetic permeability of the powder compact can be set to 50 or more and 500 or less and further 200 or more and 500 or less.

The soft magnetic powder of the powder compact is an aggregate of soft magnetic particles made of an iron group metal such as iron or an alloy thereof (Fe—Si alloy, Fe—Ni alloy or the like). Insulation coatings made of phosphate may be formed on the surfaces of the soft magnetic particles. Further, a lubricant and the like may be contained in the raw material powder.

On the other hand, a compact made of a composite material can be manufactured by filling a mixture of a soft magnetic powder and an uncured resin into a mold and curing the resin. Because of its manufacturing method, the content of the soft magnetic powder is easily adjusted in the composite material. For example, the content of the soft magnetic powder in the composite material can be set to 30% by volume or more and 80% by volume or less. The content of the magnetic powder is preferably 50% by volume or more, 60% by volume or more and 70% by volume or more in terms of improving saturation magnetic flux density and heat dissipation. Further, the content of the magnetic powder is preferably set to 75% by volume or less in terms of improving fluidity in a manufacturing process. The relative magnetic permeability of the compact made of the composite material is easily reduced if a filling rate of the soft magnetic powder is adjusted to be low. For example, the relative magnetic permeability of the compact made of the composite material can be set to 5 or more and 50 or less and further 20 or more and 50 or less.

The same soft magnetic powder usable in the powder compact can be used as the soft magnetic powder of the composite material. On the other hand, examples of the resin contained in the composite material include thermosetting resins, thermoplastic resins, room temperature curing resins and low temperature curing resins. The thermosetting resin is, for example, an unsaturated polyester resin, an epoxy resin, a urethane resin or a silicone resin. The thermoplastic resin is, for example, a polyphenylene sulfide resin, a polytetrafluoroethylene resin, a liquid crystal polymer, a polyamide resin such as nylon 6 or nylon 66, a polybutylene terephthalate resin or an acrylonitrile-butadiene-styrene resin. Besides, a BMC (Bulk Molding Compound) in which calcium carbonate and glass fibers are mixed in an unsaturated polyester, millable-type silicone rubber, millable-type urethane rubber and the like can also be utilized. The heat dissipation of the above composite material is further enhanced if a non-magnetic and non-metal powder (filler) such as alumina or silica is contained in addition to the soft magnetic powder and the resin. The content of the non-magnetic and non-metal powder may be set to 0.2% by mass or more and 20% by mass or less, further 0.3% by mass or more and 15% by mass or less, and furthermore 0.5% by mass or more and 10% by mass or less.

<<Holding Members>>

The holding member 4 shown in FIG. 2 is a member interposed between the end surfaces of the winding portions 2A, 2B of the coil 2 and the inner surface 32*e* of the outer core portion 32 of the magnetic core 3 for holding the end surfaces in the axial direction of the winding portions 2A, 2B and the outer core portion 32. The holding member 4 is typically made of an insulating material such as a polyphenylene sulfide resin. The holding member 4 functions as an insulating member between the coil 2 and the magnetic core 3 and a positioning member for the inner core portions 31 and the outer core portions 32 with respect to the winding portions 2A, 2B. Two holding members 4 of this example have the same shape. Thus, a mold for manufacturing the holding members 4 can be used in common, wherefore the productivity of the holding members 4 is excellent. The holding members 4 can also be omitted.

Figure 3:
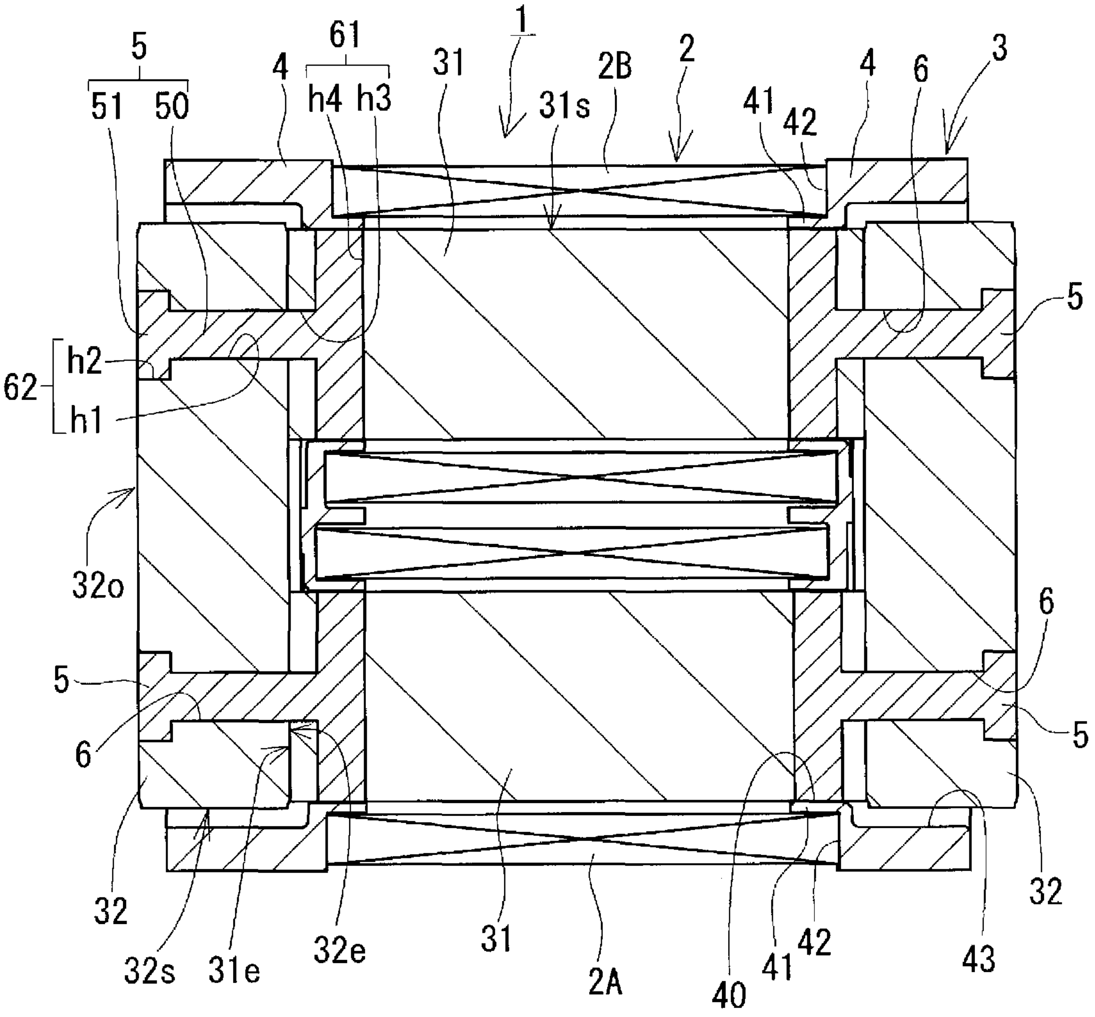
FIG. 3 is a horizontal section of a reactor of a second embodiment.

The holding member 4 includes a pair of through holes 40, 40, a pair of core supporting portions 41, a pair of coil accommodating portions 42 and one core accommodating portion 43. The through holes 40 penetrate through the holding member 4 in a thickness direction, and the end parts of the inner core portions 31 are inserted into these through holes 40. The core supporting portions 41 are tubular pieces projecting from the inner peripheral surfaces of the respective through holes 40 toward the inner core portions 31 to support the inner core portions 31. The coil accommodating portions 42 (FIG. 2) are recesses extending along the end surfaces of the respective winding portions 2A, 2B and formed to surround the core supporting portions 41, and the end surfaces of the respective winding portions 2A, 2B and the vicinities thereof are fit therein. The core accommodating portion 43 is formed by recessing a part of a surface of the holding member 4 on the side of the outer core portion 32 in the thickness direction, and the inner surface 32*e* of the outer core portion 32 and the vicinity thereof are fit therein. The end surfaces 31*e* of the inner core portions 31 fit into the through holes 40 of the holding member 4 project from the bottom surface of the core accommodating portion 43 (FIG. 3). Thus, the end surfaces 31*e* of the inner core portions 31 and the inner surface 32*e* of the outer core portion 32 are in contact.

<<Coupling Shafts>>

The reactor 1 of this example is provided with two coupling shafts 5. One coupling shaft 5 couples the left outer core portion 32, the inner core portion 31 accommodated in the winding portion 2A and the right outer core portion 32 in FIG. 2. The other coupling shaft 5 couples the left outer core portion 32, the inner core portion 31 accommodated in the winding portion 2B and the right outer core portion 32. The coupling shaft 5 is made of the composite material filled into the communication hole 6. Thus, the outer peripheral shape of the coupling shaft 5 matches the inner peripheral shape of the communication hole 6. The resin contained in the composite material constituting the coupling shaft 5 is fused to the inner peripheral surface of the communication hole 6 in filling the composite material into the communication hole 6. Thus, the communication hole 6 and the coupling shaft 5 are held in close contact over entire lengths while hardly forming any clearance therebetween, and the outer core portions 32 and the inner core portion 31 are coupled by the coupling shaft 5.

The communication hole 6 of this example is formed by connecting the inner core hole 61 and the outer core holes 62 as already described. Thus, the communication hole 6 penetrates through one outer core portion 32, the inner core portion 31 and the other outer core portion 32. Both end parts of this communication hole 6 serve as the second hole portions h2 (parts of the outer core holes 62) having a larger cross-sectional area than other parts. Thus, the coupling shaft 5 made of the composite material filled into the communication hole 6 is composed of a thin shaft portion 50 and thick shaft portions 51. The thin shaft portion 50 is a part corresponding to the first hole portions h1 of the outer core holes 62 and the inner core hole 61. On the other hand, the thick shaft portions 51 are parts corresponding to the second hole portions h2 of the outer core portions 62. An end surface of the thick shaft portion 51 is flush with the outer surface 32*o* of the outer core portion 32. The thick shaft portion 51 is a protruding portion further protruding than the thin shaft portion 50 in a direction intersecting an axial direction of the coupling shaft 5. An end surface of this thick shaft portion 51 on the side of the inner surface 32*e* is in contact with a step between the first and second hole portions h1, h2 in the communication hole 6. That is, the thick shaft portion 51 functions as a retaining portion to be hooked to the inner peripheral surface of the communication hole 6 in the axial direction of the coupling shaft 5 to prevent the detachment of the coupling shaft 5 from the magnetic core 3. As a result, the inner core portion 31 and the outer core portions 32 can be firmly coupled by the coupling shaft 5. In this example, the outer core portion 32 is sandwiched by the thick shaft portion 51 of the coupling shaft 5 and the end surface 31*e* of the inner core portion 31, so that the outer core portion 32 is not disengaged from the inner core portion 31. According to the configuration of this example, the inner core portions 31 and the outer core portions 32 can be directly coupled without any additional component other than the coupling shafts 5.

The composition of the composite material constituting the coupling shafts 5 can be appropriately selected. If parts of the magnetic core 3, e.g. the inner core portions 31, are constituted by the composite material, the composition of the composite material constituting the coupling shafts 5 may be the same as or different from that of the composite material constituting the inner core portions 31. If the compositions of the coupling shafts 5 and the inner core portions 31 are the same, nonuniformity in magnetic properties of the inner core portions 31 including the coupling shafts 5 can be suppressed.

If the composition of the coupling shafts 5 and that of the inner core portions 31 are different, a resin content of the coupling shafts 5 can be made more than that of the inner core portions 31. By doing so, the composite material is easily filled into the communication holes 6. In that case, it is preferred to prevent the content of the soft magnetic powder of the coupling shafts 5 from becoming excessively low in order to suppress a reduction in the magnetic properties of the coupling shafts 5. For example, the resin content of the coupling shafts 5 may be set to 50% by volume or more and 60% by volume or less, and the content of the soft magnetic powder may be set to 40% by volume or more and 50% by volume or less. On the other hand, the resin content of the coupling shafts 5 may be less than that of the inner core portions 31. This configuration is, namely, a configuration for making the content of the soft magnetic powder of the coupling shafts 5 more than that of the soft magnetic powder of the inner core portions 31. Since the coupling shafts 5 are located in centers of magnetic paths in the inner core portions 31, the magnetic properties of the magnetic core 3 can be improved by improving the magnetic properties of the coupling shafts 5. For example, the resin content of the coupling shafts 5 may be set to 30% by volume or more and 40% by volume or less, and the content of the soft magnetic powder may be set to 60% by volume or more and 70% by volume or less.

In filling the composite material into the communication hole 6, the composite material may be filled only from one end side of the communication hole 6 or may be filled from one end side and the other end side.

Use Mode

The reactor 1 of this example can be utilized as a constituent member of a power conversion device such as a bidirectional DC-DC converter to be installed in an electrically driven vehicle such as a hybrid vehicle, an electric vehicle or a fuel cell vehicle. The reactor 1 of this example can be used in a state immersed in a liquid refrigerant. The liquid refrigerant is not particularly limited, but ATF (Automatic Transmission Fluid) or the like can be utilized as the liquid refrigerant in the case of utilizing the reactor 1 in a hybrid vehicle. Besides, fluorine-based inactive liquids such as Fluorinert (registered trademark), chlorofluorocarbon refrigerants such as HCFC-123 and HFC-134a, alcohol-based refrigerants such as methanol and alcohol, ketone-based refrigerants such as acetone and the like can be utilized as the liquid refrigerant. Since the winding portions 2A, 2B are exposed to outside in the reactor 1 of this example, the winding portions 2A, 2B are directly brought into contact with the refrigerant in the case of cooling the reactor 1 by the refrigerant such as the liquid refrigerant. Thus, the reactor 1 of this example is excellent in heat dissipation.

Effects

The reactor 1 of this example can be manufactured with good productivity in a simple procedure. This is because the inner core portions 31 and the outer core portions 32 are easily aligned when the reactor 1 is manufactured since both the inner core portions 31 and the outer core portions 32 are integrated bodies having an undivided structure. Further, if the inner core portions 31 and the outer core portions 32 are aligned and the composite material is filled into the communication holes 6 penetrating through the outer core portions 32 and the inner core portions 31, the resin of the composite material is fused to the communication holes 6. As a result, the communication holes 6 and the coupling shafts 5 made of the composite material are held in close contact over the entire lengths while hardly forming any clearance therebetween, and the outer core portions 32 and the inner core portions 31 are coupled by the coupling shafts 5. The completion of the reactor 1 only by filling the composite material into the communication holes 6 also contributes to an improvement in the productivity of the reactor 1.

Further, in the reactor 1 of this example, a reduction in magnetic properties required for the reactor 1 is unlikely to occur. This is because a reduction in magnetic properties required for the magnetic core 3 of the reactor 1 is suppressed since the coupling shafts 5 coupling the inner core portions 31 and the outer core portions 32 is made of the composite material.

Second Embodiment

In a second embodiment, a reactor 1 in which communication holes 6 communicating with outer core portions 32 and inner core portions 31 are formed into a T shape is described on the basis of FIG. 3.

As shown in FIG. 3, the reactor 1 of this example includes four independent communication holes 61. Each communication hole 6 functions to couple one inner core portion 31 and one outer core portion 32.

The communication hole 6 of this example is composed of an inner core hole 61 and an outer core hole 62. The shape of the outer core hole 62 is the same as in the first embodiment. On the other hand, the inner core hole 61 is formed into a substantially T shape by being composed of a third hole portion h3 and a fourth hole portion h4. The third hole portion h3 is a short hole having an inner shape matching the first hole portion h1 of the outer core hole 62. The fourth hole portion h4 is a hole extending in a direction intersecting the third hole portion h3 and open in a peripheral surface 31*s* of the inner core portion 31. The fourth hole portion h4 of this example extends in the direction orthogonal to an axial direction of the third hole portion h3 (i.e. axial direction of the inner core portion 31). Openings of the fourth hole portion h4 are entirely covered by a core supporting portion 41 of a holding member 4.

The substantially T-shaped inner core hole 61 is, for example, formed as follows. First, the fourth hole portion h4 penetrating through the peripheral surface 31*s* of the inner core portion 31 is formed by a drill or the like. Subsequently, cutting is performed from an end surface 31*e* of the inner core portion 31 in the axial direction of the inner core portion 31 by the drill or the like to form the third hole portion h3 leading to the fourth hole portion h4. If the inner core portion 31 is made of a composite material, the both hole portions h3, h4 can be formed, using a mold core to be removed in the axial direction of the inner core portion 31 and a mold core to be removed in an orthogonal direction.

If the composite material is filled from a position of the communication hole 6 open in an outer surface 32*o*, the composite material enters the fourth hole portion h4 via the third hole portion h3 from the outer core hole 62, and a part having entered the fourth hole portion h4 becomes a protruding portion (retaining portion) of a coupling shaft 5. At this time, since the openings of the fourth hole portion h4 are covered by the core supporting portion 41, the composite material does not leak to the inside of winding portion 2A, 2B and a core accommodating portion 43 from the openings of the fourth hole portion h4.

The reactor 1 of this example can also obtain effects similar to those of the reactor 1 of the first embodiment. Further, according to the reactor 1 of this example, since the coupling shaft 5 is hardly removed from the inner core portion 31, the inner core portion 31 and the outer core portion 32 can be more firmly coupled.

Third Embodiment

Figure 4:
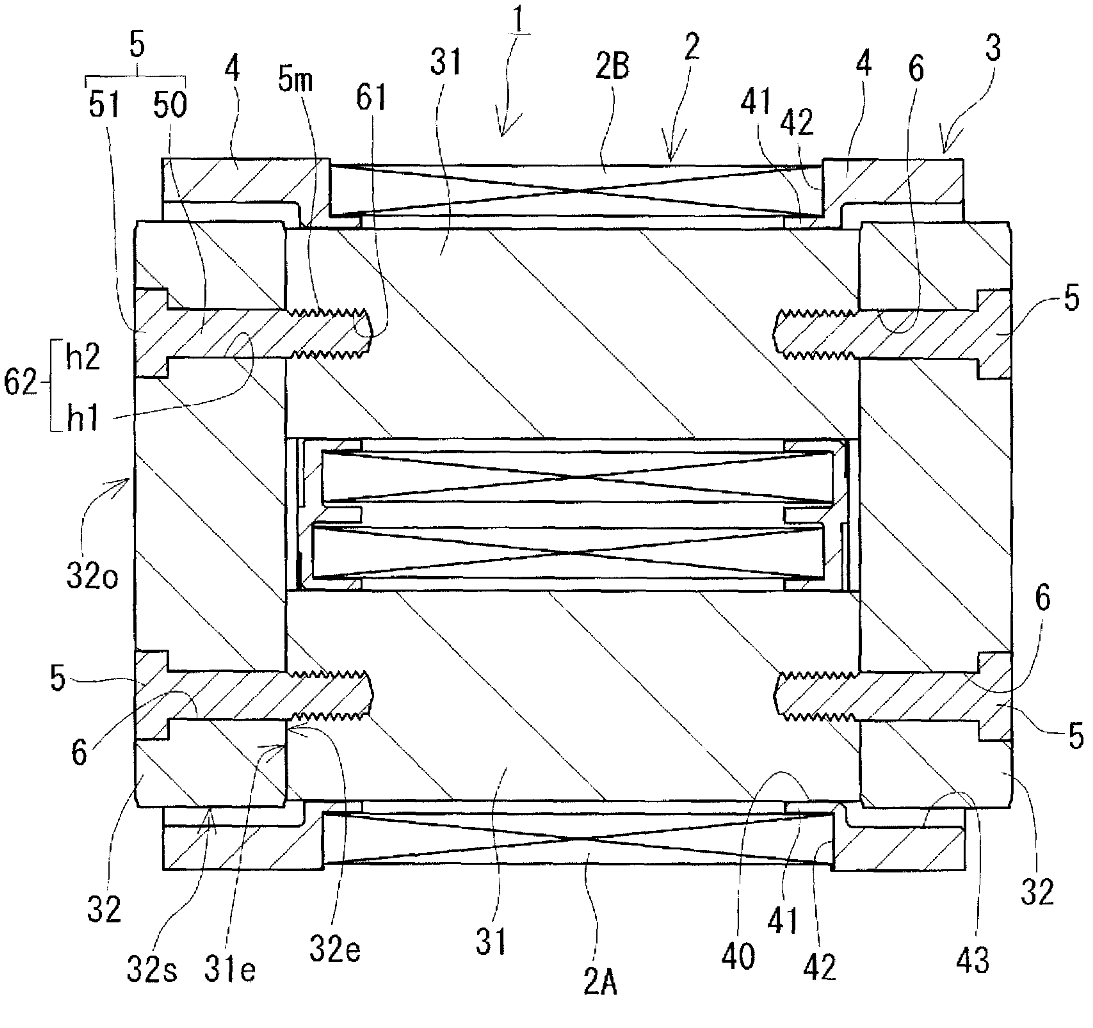
FIG. 4 is a horizontal section of a reactor of a third embodiment.

In a third embodiment, a reactor 1 in which retaining portions formed in inner core holes 61 are formed by thread-like irregularities is described on the basis of FIG. 4.

As shown in FIG. 4, the reactor 1 of this example includes four independent communication holes 6. An outer core hole 62 of the communication hole 6 of this example is the same as in the first embodiment. On the other hand, internal thread-like irregularities are formed on the inner peripheral surface of an inner core hole 61. Thus, if a composite material is filled into the communication hole 6, the outer periphery of a part arranged in the inner core hole 61, out of a thin shaft portion 50 of the coupling shaft 5, becomes a screw-shaped portion 5*m*. This screw-shaped portion 5*m* is hooked to the uneven inner peripheral surface of the inner core hole 61 and functions as a retaining portion of the coupling shaft 5.

Here, the threaded inner peripheral surface of the inner core hole 61 can be formed by being processed by a tap or the like. Besides, if the inner core portion 31 is formed of the composite material, the threaded shape can also be formed by using an externally threaded mold core. In this case, the inner core hole 61 having the threaded inner peripheral surface is formed by removing the core from the inner core portion 31 while rotating the mold core.

The reactor 1 of this example can also obtain effects similar to those of the reactor 1 of the first embodiment. The reactor 1 of this example has an advantage that the inner core holes 61 are relatively easily formed.

The screw-shaped portion 5*m* may be formed over the entire length of the coupling shaft 5 as a modification of this example.

Fourth Embodiment

Figure 5:
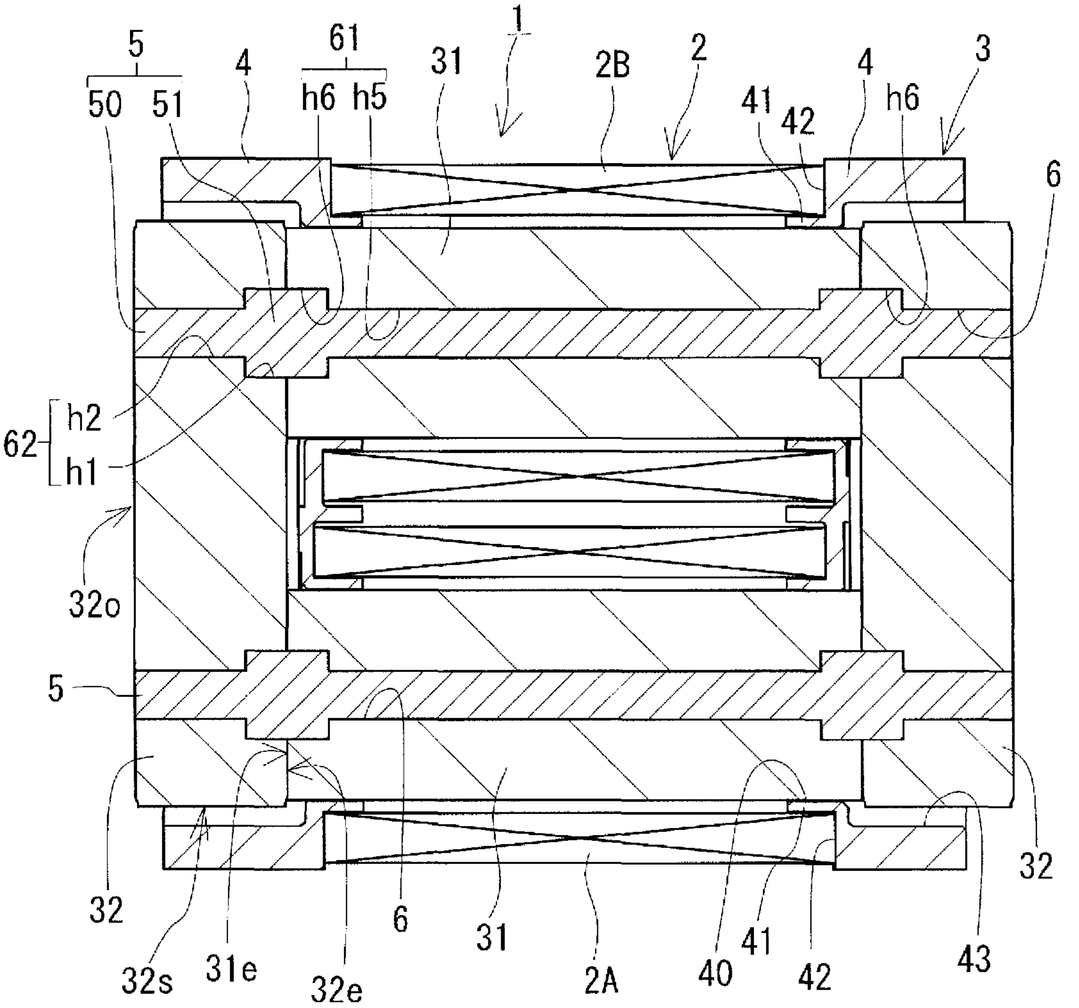
FIG. 5 is a horizontal section of a reactor of a fourth embodiment.

In a fourth embodiment, a reactor 1 in which protruding portions (thick shaft portions 51) of coupling shafts 5 are formed over outer core portions 32 and inner core portions 31 is described on the basis of FIG. 5.

As shown in FIG. 5, a communication hole 6 into which the coupling shaft 5 of this example is fit penetrates through one outer core portion 32, the inner core portion 31 and the other outer core portion 32, similarly to the reactor 1 of the first embodiment. In an outer core hole 62, a cross-sectional area of a first hole portion h1 on the side of the inner core portion 31 is larger than that of a second hole portion h2 on the side of an outer surface 32*o*. On the other hand, an inner core hole 61 is composed of a fifth hole portion h5 extending substantially over the entire length in an axial direction of the inner core portion 31 and sixth hole portions h6 formed on one and the other ends of the fifth hole portion h5. The inner peripheral surface shape and cross-sectional area of the fifth hole portion h5 are the same as those of the second hole portions h2. The inner peripheral surface shape and cross-sectional area of the sixth hole portions h6 are the same as those of the first hole portions h1.

The inner core hole 61 and the outer core holes 62 shaped as described above are, for example, formed as follows. First, a through hole is formed in the inner core portion 31 (outer core portions 32) by a thin drill. Subsequently, short holes are formed in end surface s31*e* (inner surfaces 32*e*) by a thick drill. In this case, the hole formed by the thin drill becomes the fifth hole portion h5 (second hole portions h2) and the holes formed by the thick drill become the sixth hole portions h6 (first hole portions h1).

The coupling shaft 5 made of the composite material fit into the communication hole 6 includes two thick shaft portions 51 at intermediate axial positions of the thin shaft portion 50. The thick shaft portion 51 is constituted by the composite material filled into a space formed by the first hole portion h1 and the sixth hole portion h6. Thus, the thick shaft portion 51 is formed over the inner core portion 31 and the outer core portion 32.

According to the reactor 1 of this example, an effect of being able to reduce leakage magnetic fluxes from boundaries between the inner core portions 31 and the outer core portions 32 can be obtained in addition to effects similar to those of the reactor 1 of the first embodiment. In this example, the end surface 31*e* of the inner core portion 31 and the inner surface 32*e* of the outer core portion 32 are in contact. However, if fine irregularities are present in the end surface 31*e* and the inner surface 32*e*, a plurality of local gaps may be formed between the end surface 31*e* and the inner surface 32*e*. If a transverse cross-sectional area of the thick shaft portion 51 is increased, the number of the local gaps can be reduced since an area of parts of the end surface 31*e* and the inner surface 32*e* facing each other can be reduced. As a result, the leakage magnetic fluxes of the reactor 1 can be reduced and magnetic loss of the reactor 1 can be reduced.

Other Embodiments

The reactor 1 may be manufactured with the configurations relating to the coupling shafts 5 of the first to fourth embodiments appropriately combined. For example, internal thread-like irregularities may be formed on the inner peripheral surface of the inner core holes 61 of the first embodiment shown in FIG. 2. Further, in the configuration of the fourth embodiment, the thick shaft portions 51 may be formed also on the side of the outer surfaces 32*o* of the outer core portions 32. By combining a plurality of configurations relating to the coupling shafts 5, the inner core portions 31 and the outer core portions 32 are possibly more firmly coupled.

LIST OF REFERENCE NUMERALS

- 1 reactor
- 2 coil, 2*w* winding wire
  - 2A, 2B winding portion, 2R coupling portion, 2*a*, 2*b* end part
- 3 magnetic core
  - 31 inner core portion, 31*e* end surface, 31*s* peripheral surface
  - 32 outer core portion, 32*e* inner surface, 32*o* outer surface, 32*s* peripheral surface
- 4 holding member
  - 40 through hole, 41 core supporting portion, 42 coil accommodating portion, 43 core accommodating portion
- 5 coupling shaft
  - 50 thin shaft portion, 51 thick shaft portion, 5*m* screw-shaped portion
- 6 communication hole
  - 61 inner core hole
    - h3 third hole portion, h4 fourth hole portion, h5 fifth hole portion, h6 sixth hole portion
  - 62 outer core hole
    - h1 first hole portion, h2 second hole portion

What is claimed is:

1. A reactor, comprising:

a coil including a winding portion; and a magnetic core including an inner core portion to be arranged inside the winding portion and an outer core portion to be arranged outside the winding portion;

wherein:

the magnetic core includes:

a communication hole penetrating through the outer core portion and leading to the inner core portion; and a coupling shaft made of a composite material filled into the communication hole, the coupling shaft coupling the inner core portion and the outer core portion, wherein the coupling shaft includes a retaining portion to be hooked to an inner peripheral surface of the communication hole in an axial direction of the coupling shaft, and the composite material is obtained by dispersing a soft magnetic powder in a resin.

2. The reactor of claim 1, wherein each of the inner core portion and the outer core portion is an integrated body having an undivided structure.

3. The reactor of claim 1, wherein the inner core portion is made of a composite material obtained by dispersing a soft magnetic powder in a resin.

4. The reactor of claim 1, wherein the outer core portion is constituted by a powder compact made of a soft magnetic powder.

5. The reactor of claim 1, wherein:

the coupling shaft includes a protruding portion protruding in a direction intersecting the axial direction, and the retaining portion is formed by the protruding portion.

6. The reactor of claim 5, wherein the retaining portion is formed inside the outer core portion.

7. The reactor of claim 6, wherein the retaining portion is also formed inside the inner core portion.

8. The reactor of claim 5, wherein the protruding portion is formed over the outer core portion and the inner core portion.

* * * * *